US009969279B2

(12) United States Patent  
Southey et al.

(10) Patent No.: US 9,969,279 B2  
(45) Date of Patent: May 15, 2018

(54) VEHICLE CHARGEPORT CLOSURE

(71) Applicant: Ford Global Technologies, LLC, Dearborn, MI (US)

(72) Inventors: Bruce Southey, Farnham (GB); Andrew John Murray, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/370,205

(22) Filed: Dec. 6, 2016

(65) Prior Publication Data

US 2017/0197515 A1    Jul. 13, 2017

(30) Foreign Application Priority Data

Jan. 11, 2016    (GB) .................................. 1600430.1

(51) Int. Cl.
 *B60L 11/18*  (2006.01)
 *B60K 15/05*  (2006.01)

(52) U.S. Cl.
 CPC .......... *B60L 11/1818* (2013.01); *B60K 15/05* (2013.01); *B60K 2015/053* (2013.01)

(58) Field of Classification Search
 CPC ................ B60L 11/1818; B60K 15/15; B60K 2015/053

USPC ........................................................ 296/97.22
 See application file for complete search history.

(56) References Cited

U.S. PATENT DOCUMENTS

| 2004/0094230 A1* | 5/2004 | Ono .......................... F17C 6/00 141/286 |
| 2012/0252250 A1* | 10/2012 | Kurumizawa ..... H01R 13/6275 439/304 |
| 2015/0104961 A1* | 4/2015 | Bito .................... B60L 11/1818 439/142 |
| 2015/0137755 A1 | 5/2015 | Sadano et al. |
| 2017/0210235 A1* | 7/2017 | Lopez ................. B60L 11/1818 |

FOREIGN PATENT DOCUMENTS

| EP | 2347924 A1 | 7/2011 | |
| EP | 2865559 A2 | 4/2015 | |
| FR | 1158370 A * | 9/2011 | ............. E05B 83/34 |
| JP | 2014110091 A | 6/2014 | |
| WO | 2014171035 A1 | 10/2014 | |

\* cited by examiner

*Primary Examiner* — Jason S Morrow  
(74) *Attorney, Agent, or Firm* — Jason Rogers; Price Heneveld LLP

(57) ABSTRACT

A two part closure for a combo chargeport for use on an electric vehicle is provided. The closure comprises: an inner part including a dust cover for a DC chargeport; and an outer part configured to cover the AC chargeport. The inner and outer parts are hingeably attached to the vehicle such that the closure can be closed with a single action.

20 Claims, 10 Drawing Sheets

VEHICLE CHARGEPORT CLOSURE

FIELD OF THE INVENTION

This invention generally relates to improvements in or relating to chargeports and, in particular, to chargeport doors for use in hybrid or electric vehicles.

BACKGROUND OF THE INVENTION

Electric vehicles are typically provided with a chargeport through which they can be charged. The chargeport can be located on the exterior of the vehicle to allow the user to charge the vehicle batteries from an external power source. This power source may be an alternating current (AC) or direct current (DC) power source. In order to accommodate these alternative charging capabilities within a compact package, 'combo' connectors have been developed.

A combo connector, for example the SAE J1772 combo connector, comprises separate AC and DC charging elements within a common footprint. These elements are positioned adjacent to one another, typically with the AC charging element above the DC charging element. For AC charging, only the top part of the connector is used, whereas for DC charging, the whole connector is used.

The presence of this shared geometry can present problems in terms of environmental contamination during AC charging as the DC element of the charging port is unused and as such may be subject to the ingress of dust, water, snow or other environmental pollutants. In order to address this, it is known to provide a dust cover for the DC element of the charging port for use during AC charging. These dust covers may be loose or may be tethered to the chargeport.

SUMMARY OF THE INVENTION

According to one aspect of the present invention, there is provided a two part closure for a combo chargeport comprising an AC chargeport and a DC chargeport, the combo chargeport configured for use on an electric vehicle and comprising: an inner part including a dust cover for a DC chargeport; an outer part configured to cover the AC chargeport, wherein the inner and outer parts are hingeably attached to the vehicle such that the closure can be opened for DC charging with a single action and closed with a single action. The ability to close the closure of the combo chargeport from either being used in the AC or DC charging configuration with a single action considerably improves the user experience. The provision of a two-part closure incorporating the dust cover for the DC portion of the chargeport means that the DC cover is integral to the vehicle and cannot be lost or dropped or trapped as a result of incorrect alignment. This means that the user has to make only one action to close the closure and this automatically includes replacing the dust cover in the correct position.

It will be understood by those skilled in the art that the term "dust cover" refers to any protective cover that is designed to prevent the ingress of unwanted matter into the DC chargeport. The unwanted matter is not limited to dust and may include rain water, snow, pollen and mud. The dust cover will therefore be fabricated from a material suitable for the purpose of keeping out all unwanted matter from the DC chargeport and may or may not incorporate a separate seal as necessary.

The inner part and/or the outer part may comprise a substantially planar door. The provision of the inner and outer parts in the form of substantially planar doors enables the closure as a whole to be provided as a compact package. Where the closure is provided on the exterior of the vehicle, a primary surface of the inner and outer substantially planar doors may be configured to match the contours of the vehicle exterior when the doors are in a closed position. From an aesthetic perspective, this provides a package that is similar to a fuel filler door on a conventionally fueled vehicle and ensures that the closure does not interfere with the styling of the vehicle.

The closure may be provided on the exterior of the vehicle. This facilitates charging without compromising the security of the vehicle as there is no access required to the vehicle cabin whilst charging.

The outer part may be substantially planar and may be configured to at least partly cover the inner part when the closure is closed.

The primary surface of the inner substantially parallel planar door may comprise an A-surface section and a B-surface section. The B-surface section is that part which is covered by the outer part when the closure is closed. Technical and aesthetic considerations for A- and B-surfaces are totally different and therefore the presence of both sections on the inner part provides advantages in terms of both functionality and appearance. The A-surface is waterproof and typically styled to match the body work of the vehicle. The B-surface is typically configured to provide a close fit between the inner and outer parts. The B-surface may be fabricated from soft rubber to avoid the potential for vibration between the two parts.

The dust cover may be provided on a secondary surface of the inner part. The dust cover may comprise a plurality of protrusions that extend substantially orthogonally from the secondary surface of the inner part. The secondary surface may be substantially parallel to the primary surface of the inner part.

The inner part may further comprise a fastener configured to hold the inner part in the closed position. The outer part may further comprise a fastener configured to hold the outer part in the closed position. The fasteners enable the closure to be held in a default, closed position and also enable the user to select and open only that part of the closure relevant for either AC or DC charging as required.

Either one or both of the fasteners provided may be push-push type latches. Push-push latches provide intuitive operation with a minimum of disruption to the exterior surface of the vehicle. The fastener may further incorporate a captive button.

The inner and outer parts may be hingeably attached to the vehicle using a single hinge axis and the fasteners may be positioned one above the other. This enables the two parts to operate by movement through the same arc.

Alternatively, the inner and outer parts may be hingeably attached using two separate hinges applied to opposite sides of the closure and the fasteners may be positioned at opposite sides of the closure.

In some embodiments, the inner part is hinged at both sides and the outer part is hinged at one side. This enables the closure to be opened in one direction for AC charging and the opposite direction for DC charging. For example, the closure could be configured such that it opens hinged at the left for AC charging and hinged at the right for DC charging. When the closure is operated for AC charging, only the outer part moves. When the closure is operated for DC charging, both the inner and outer parts move together, hinged at the right.

The fastener for the outer part may comprise a dimple on the primary surface of the outer part, a protrusion on the secondary surface of the outer part and a latch on the primary surface on the inner part.

The combo chargeport may be provided in a mounting surface which is substantially parallel to the vehicle exterior and the fastener for the inner part may comprise a captive button within the primary surface of the inner part, a protrusion on the secondary surface of the button and a latch on the mounting surface of the port. The provision of a captive button ensures that only the desired part of the closure opens.

According to another aspect of the present invention, a closure for a combo chargeport including first and second chargeports for use on an electric vehicle is provided. The closure for a combo chargeport includes an inner part including a dust cover for the first chargeport. The closure for a combo chargeport also includes an outer part configured to cover the second chargeport. The inner and outer parts are hingeably attached to the vehicle such that the closure can be opened for charging with the first chargeport in a single action and closed with a single action.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

FIGS. 1-4 show a first embodiment of a two part closure 14 for a combo chargeport 12 for use in an electric vehicle 10. The closure 14 is provided on the exterior of the vehicle 10 and the outer surface of the closure 14 is flush with the vehicle exterior when closed. The closure 14 comprises an inner part 16 and an outer part 18. The combo chargeport 12 is provided in a mounting surface 30 that is configured to be recessed slightly from, but lie substantially parallel with, the exterior surface of the vehicle 10.

Figure 1:
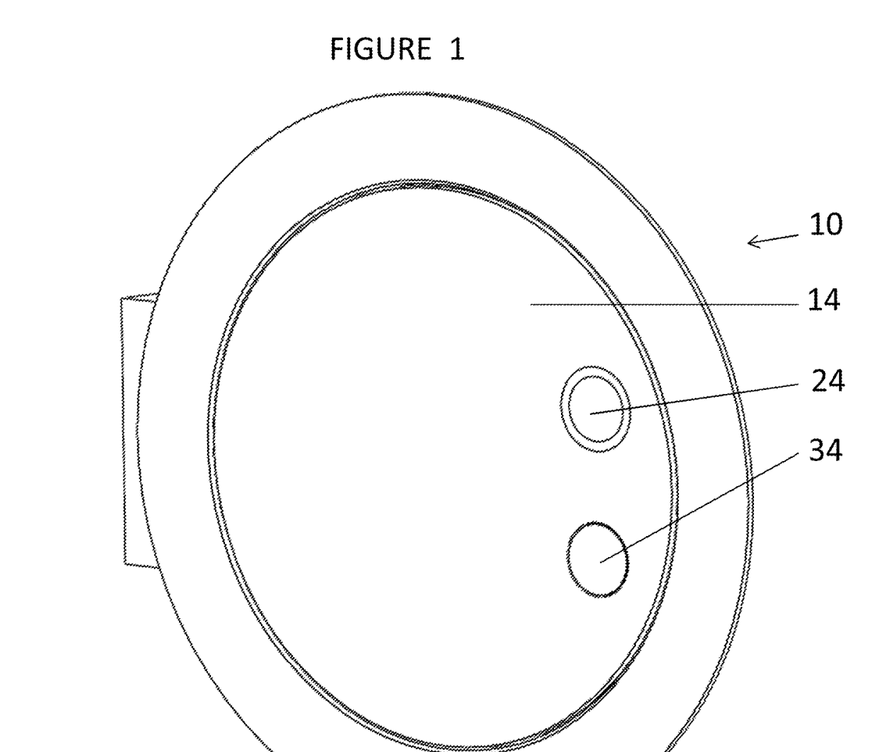
FIG. 1 is a front perspective view of a combo chargeport on a vehicle with a cover in a closed configuration, according to a first embodiment.

FIG. 1 shows the closure 14 in the closed position with a dimple 24 and a button 34 visible. The dimple 24 forms part of second fastener 22 and the button 34 forms part of the first fastener. These provide a user interface for opening the outer 18 and inner 16 parts respectively and will be described in more detail with reference to FIG. 4, below.

Figure 2:
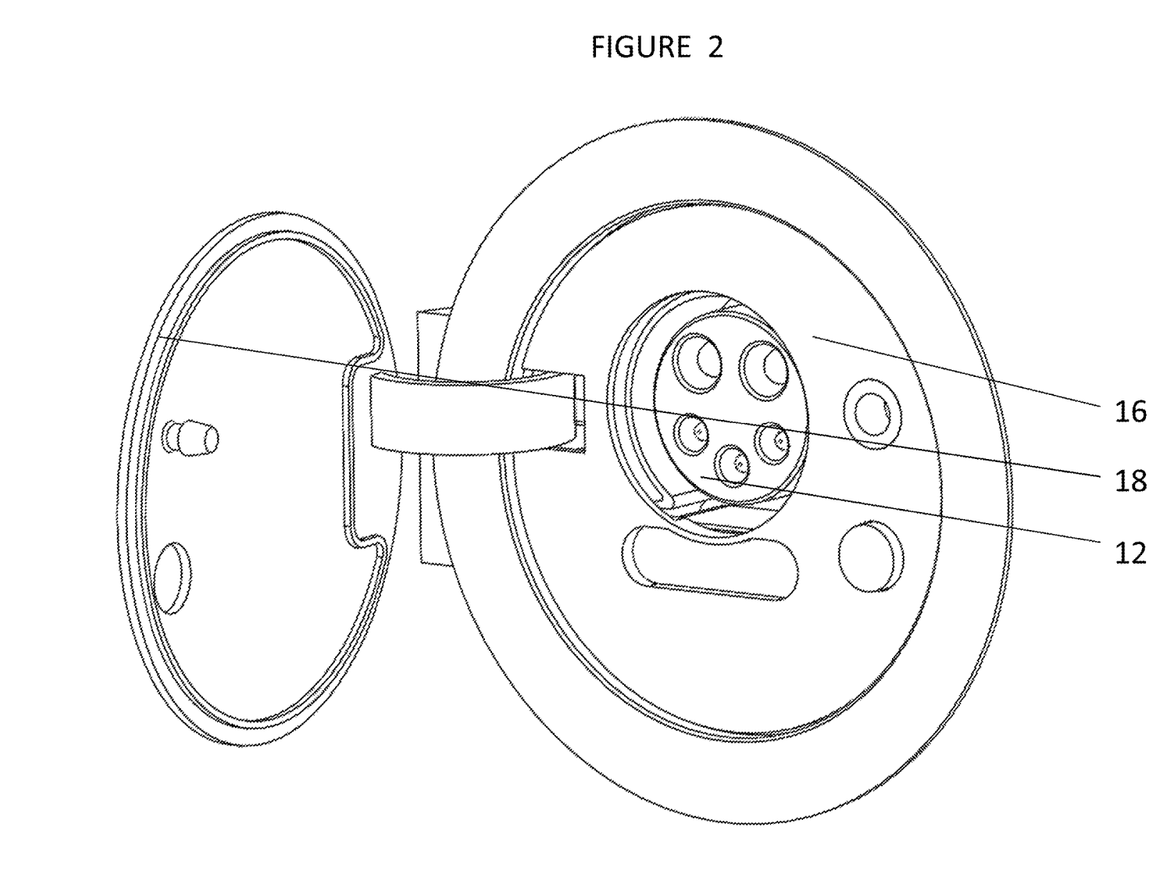
FIG. 2 is a perspective view of the chargeport of FIG. 1 with the cover configured for AC charging.

FIG. 2 shows the closure 14 open for AC charging, with the inner part 16 in place, providing an aperture that just allows access to the AC chargeport. The inner part 16 is configured as a substantially planar door having substantially the same foot print as the outer part 18. Access to the AC chargeport through the inner part 16 is facilitated by a substantially circular opening in the inner part 16.

Figure 3:
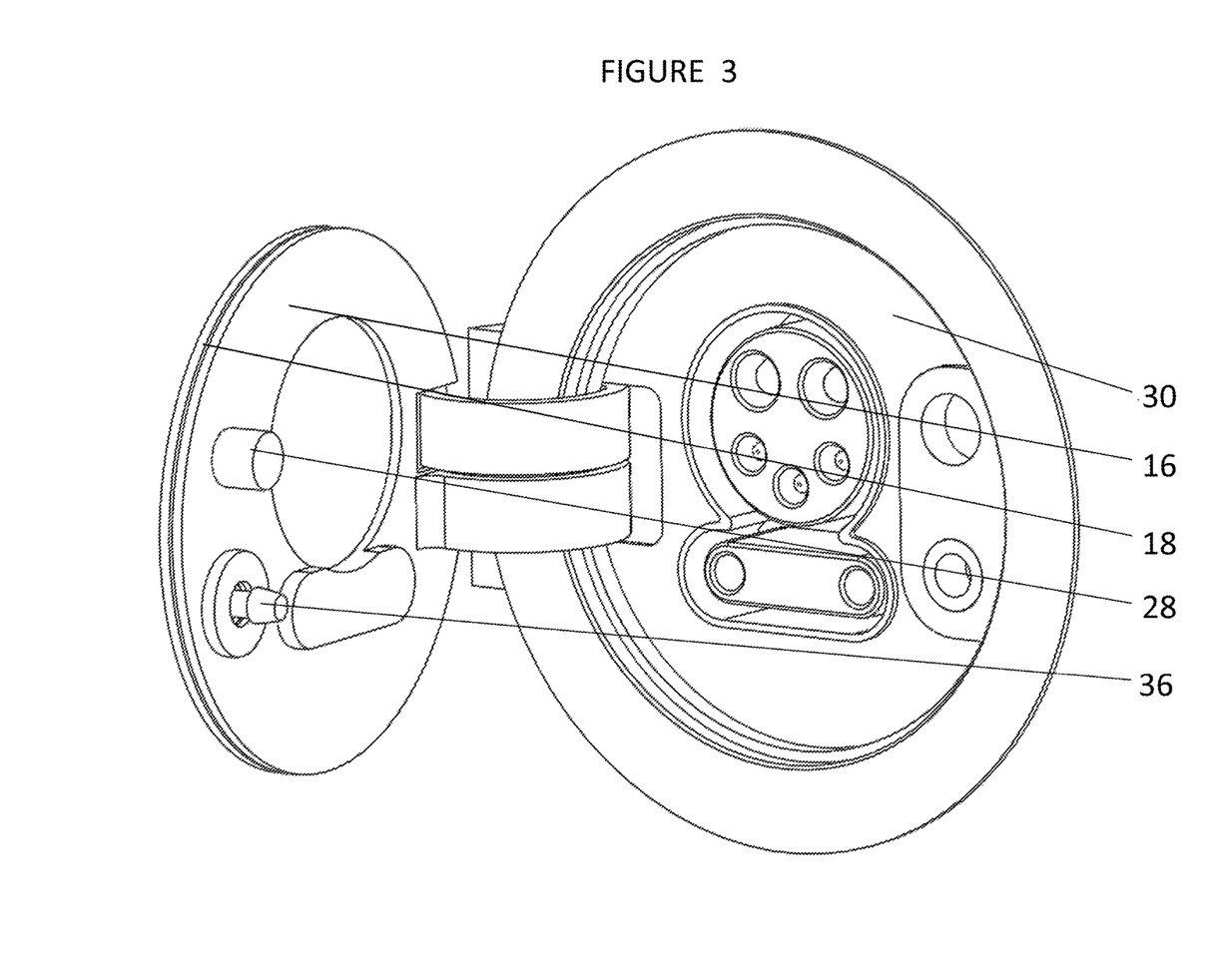
FIG. 3 is a perspective view of the chargeport in FIG. 1 with the cover configured for DC charging.

FIG. 3 shows the closure 14 open for DC charging, with the inner 16 and outer 18 parts hinged at the same side of the closure 14 and fastened together by virtue of the fastener 22 to move as one to an open position. According to one embodiment, the AC chargeport is a first chargeport and the DC chargeport is a second chargeport. The first and second chargeports may be configured as other chargeports according to further embodiments.

Figure 4:
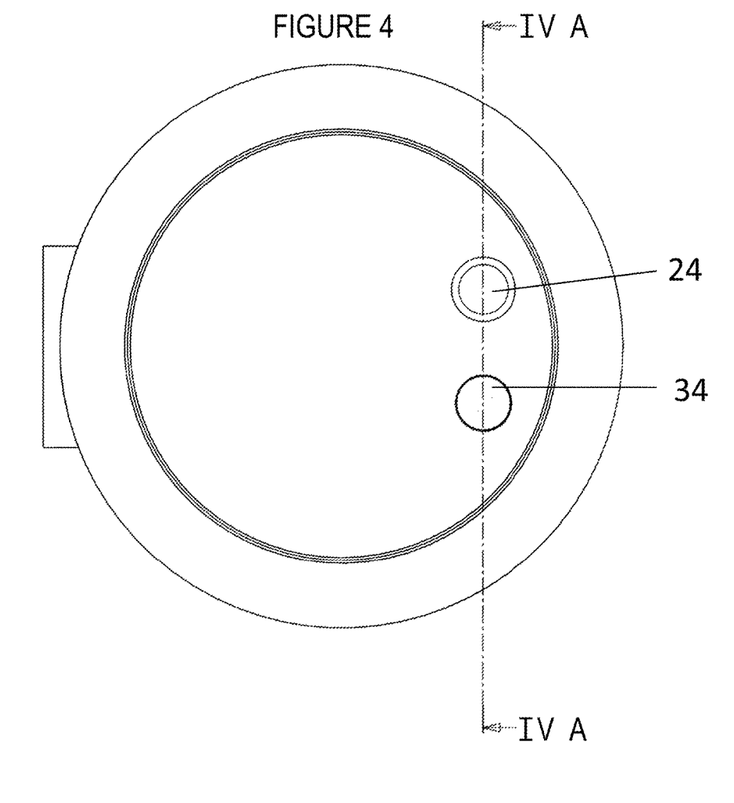
FIG. 4 is a front view of the chargeport with the cover in the closed position.
Figure 4A:
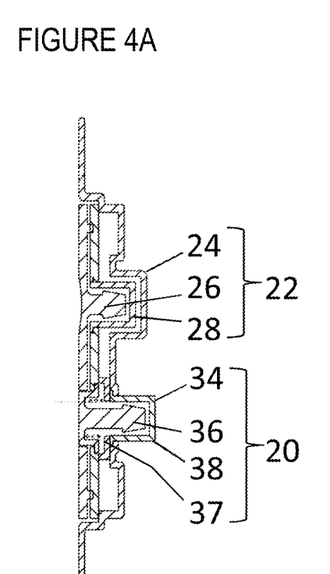
FIG. 4A is a cross-sectional view taken through line IVA-IVA of FIG. 4 showing a pair of fasteners deployed on some embodiments.

FIG. 4A shows a cross section from FIG. 4 of the closure 14 through the first and second fasteners 20, 22 which are configured to enable the latching of the inner 16 and outer 18 parts of the closure 14. The first and second fasteners 20, 22 are based on a "push-push" latch which typically operates as follows: in response to a push by a user, a protrusion interacts with hidden components that move with respect to one another causing the inner or outer part to become locked in a closed position. A second push will release the inner or outer part and permit it to move to an open position. A further push will start the lock-unlock cycle over again.

In the illustrated embodiment, the first fastener 20 comprises a captive button 34 mounted within the inner part 16 and protruding through an aperture in the outer part 18, incorporating a protrusion 36 on the reverse side and a latch (not shown) and associated recess 38 in the mounting surface 30. The mounting of the button 34 may include a spring 37 to control the button 34.

The second fastener 22 comprises a dimple 24 on the primary surface of the outer part 18 primarily for easier location by the user, a protrusion 26 on the secondary surface of the outer part and a latch (not shown) and associated recess 28 in the primary surface of the inner part 16. The inner part 16 is provided with a hard stop against the mounting surface 30 so that, in conjunction with the button 34, pressing the AC dimple 24 cannot operate the first fastener 20 of the inner part 16.

In some embodiments, other than that shown in FIG. 4, the protrusion may be permanently engaged in the latching part and/or recess behind a rubber boot which allows it to move between its two states. The inner part then acts against this sealed assembly. This configuration may reduce the ingress of dirt into the closure.

Figure 5:
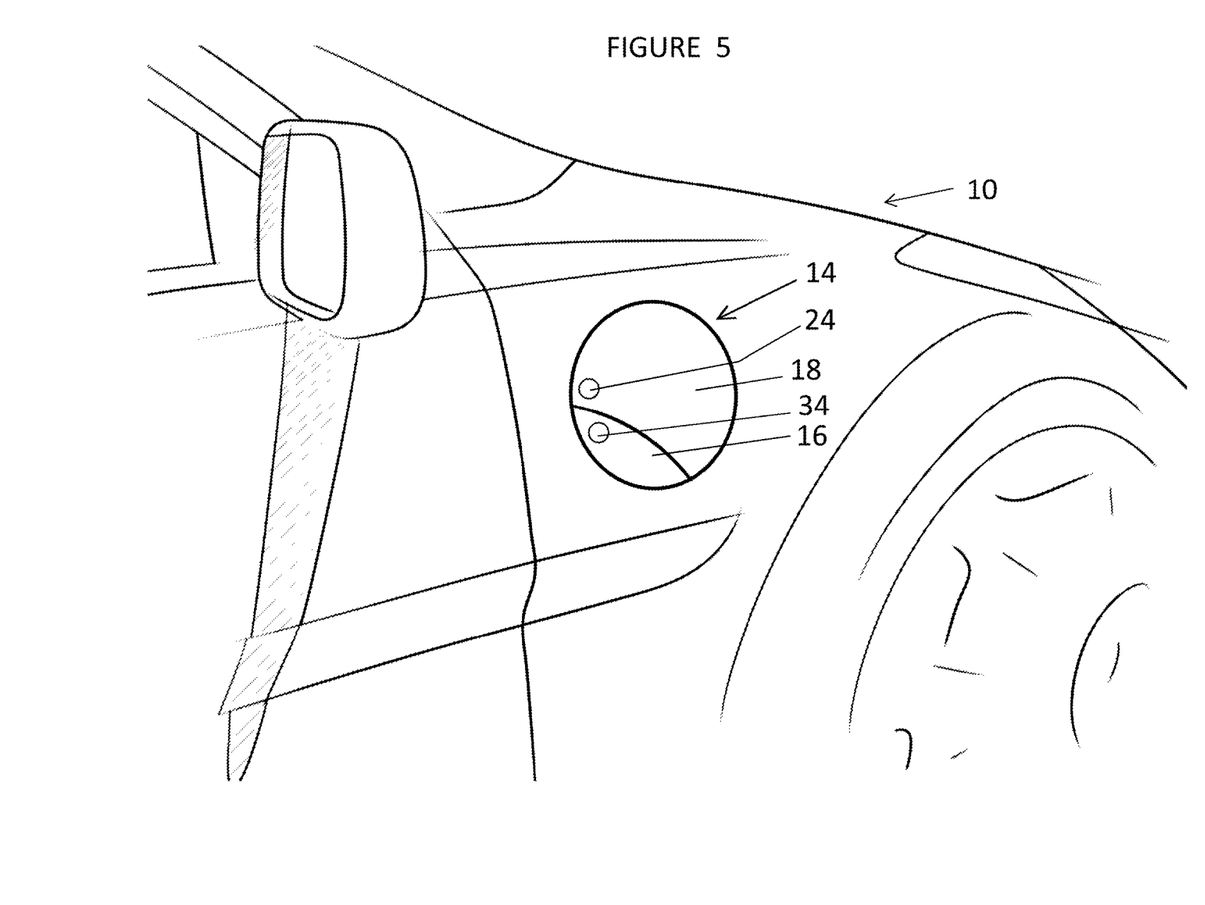
FIG. 5 is a perspective view of a chargeport on a vehicle with a cover in a closed configuration, according to a second embodiment.
Figure 6:
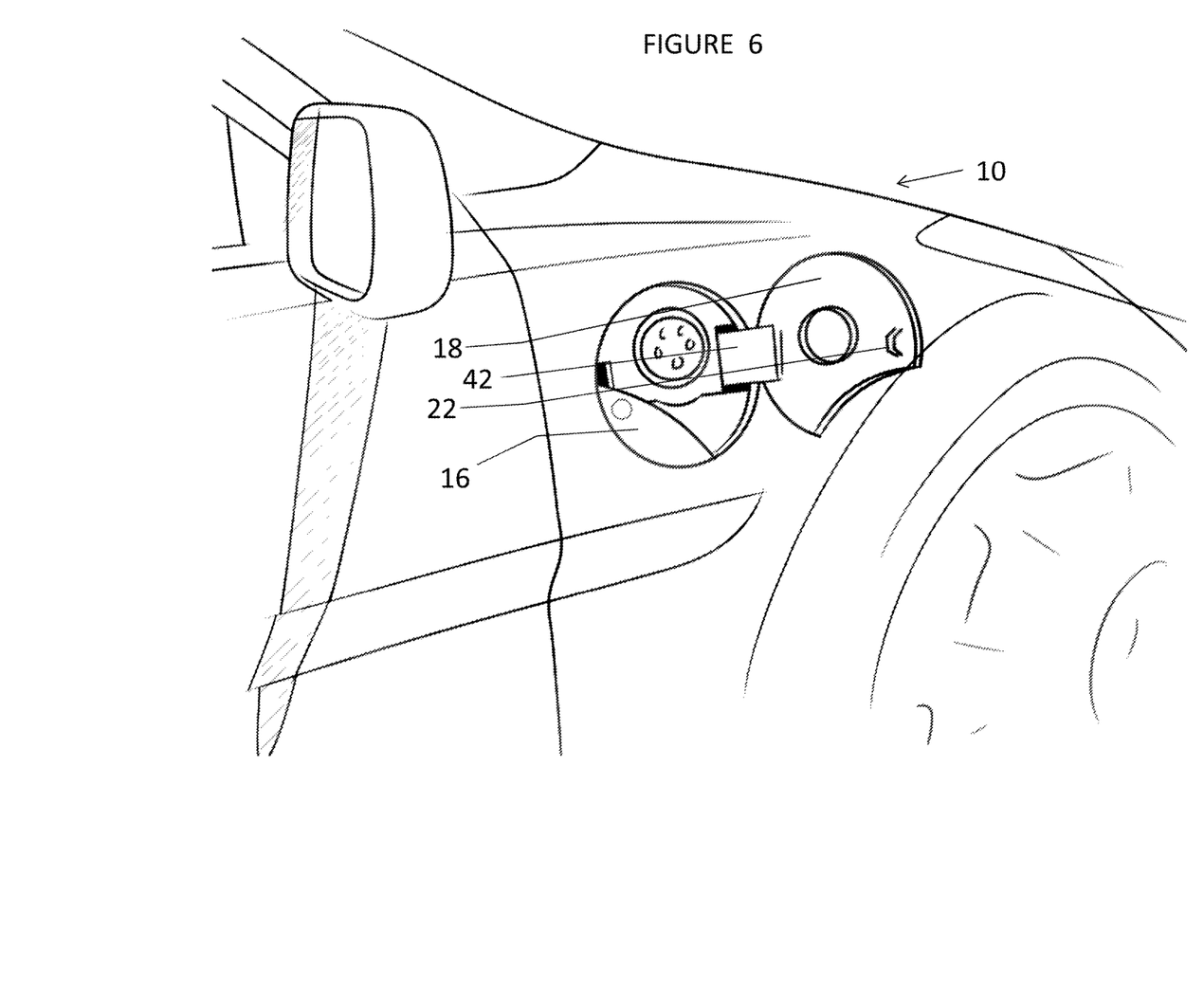
FIG. 6 is a perspective view of the chargeport shown in FIG. 5 with the cover configured for AC charging.
Figure 7:
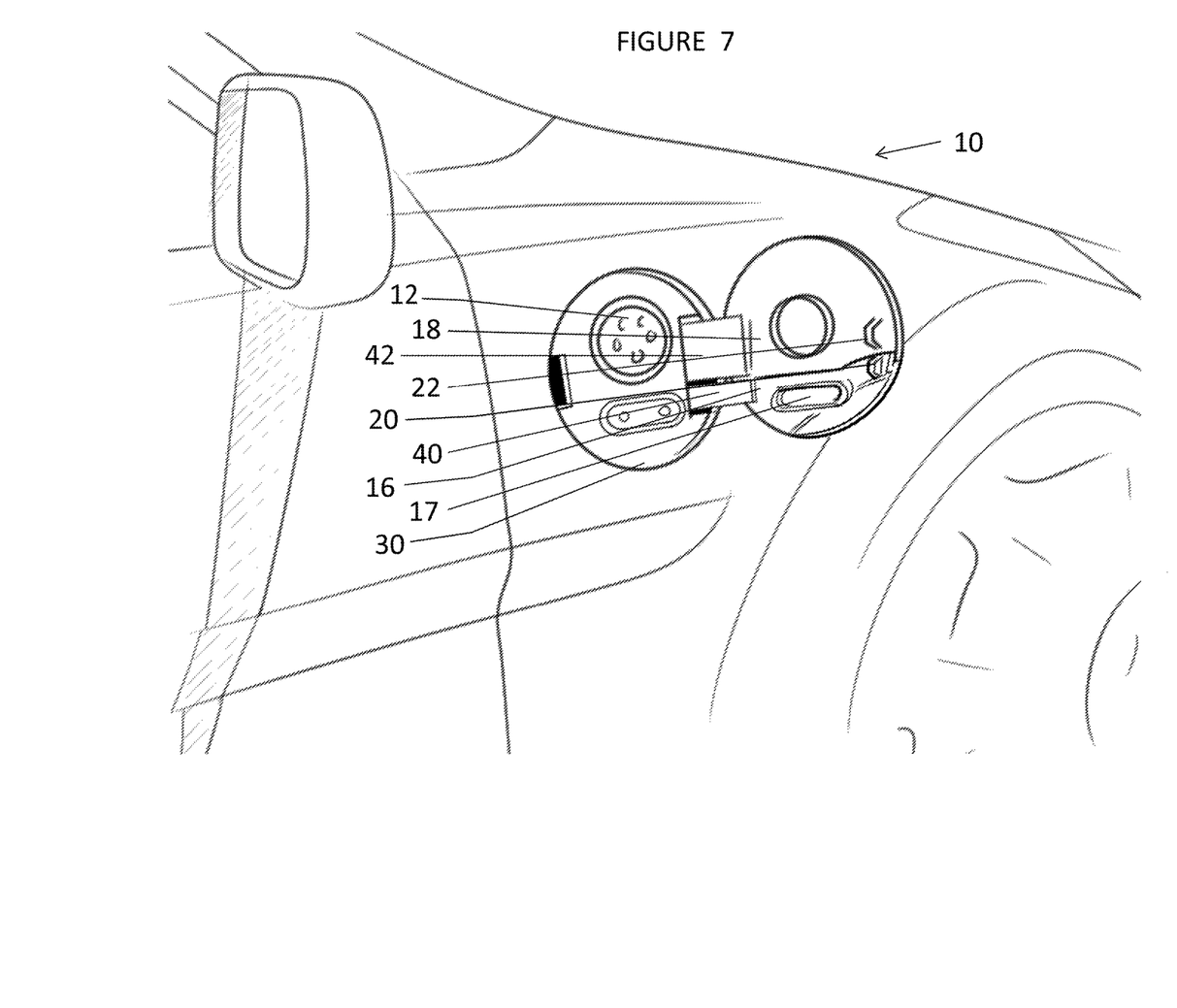
FIG. 7 is a perspective view of the chargeport shown in FIG. 5 with the cover configured for DC charging.

FIGS. 5-7 show a second embodiment of a two part closure 14 for a combo chargeport 12 for use in an electric vehicle 10. Where parts are common between the embodiments, the same reference numerals have been used to denote these parts as found above in the description of the first embodiment shown in FIGS. 1-4A.

The inner part 16 is a substantially planar door comprising a primary surface that is part A-surface and part B-surface and a secondary surface on which a dust cover 17 is provided. The inner part 16 is approximately semi-circular and is configured to cover the DC chargeport. The inner part 16 does not cover the AC chargeport and therefore this can be accessed even when the inner part 16 is closed.

The inner part 16 is configured to overlap with the outer part 18 such that the A-surface portion of the inner part 16 is visible when the closure 14 is closed. The section of the inner part 16 that is provided with a B-surface is covered by the outer part 18 when the closure 14 is closed. The B-surface may be compliant in nature to provide a good NVH rating when in contact with the outer part 18. The B-surface may be rubber and may be fabricated as a single piece including the protrusions.

The dust cover 17 comprises a plurality of protrusions that extend substantially orthogonally from the secondary surface. The length of the protrusions is selected such that, when the inner part 16 of the closure 14 is in the closed position, the protrusions interface with the DC chargeport preventing the ingress of water, dust or any other pollutants. The protrusions may be fabricated from a suitable rubber to ensure a satisfactory interface with the DC chargeport.

The outer part 18 is a substantially planar door comprising a primary surface that is an A-surface. The A-surface may be configured to match, in material and color the exterior of the vehicle.

The inner part 16 is attached to the vehicle via a hinge 40. The outer part 18 is attached to the vehicle via a hinge 42. The two hinges 40, 42 are provided on a common axis which enables the inner 16 and outer 18 parts to move together when access is required to the DC chargeport but also enables the outer part 18 to move independently when access is required to the AC chargeport.

Access to the combo chargeport 12 is provided via a pair of fasteners 20, 22. Upon pressing a dimple 24, the second fastener 22 unlatches thus enabling access to the AC chargeport. Alternatively, upon pressing the button 34, the first fastener 20 unlatches, thus enabling access to the DC chargeport. The dimple and button are located vertically above one another.

FIG. 6 shows the closure 14 when it is open for AC charging. The outer part 18 is open revealing the AC chargeport, but the DC chargeport remains covered by the inner part 16.

FIG. 7 shows the closure 14 when it is open for DC charging. The inner 16 and outer 18 parts are fastened together by virtue of the fastener 22 and have moved as one to an open position.

Figure 8:
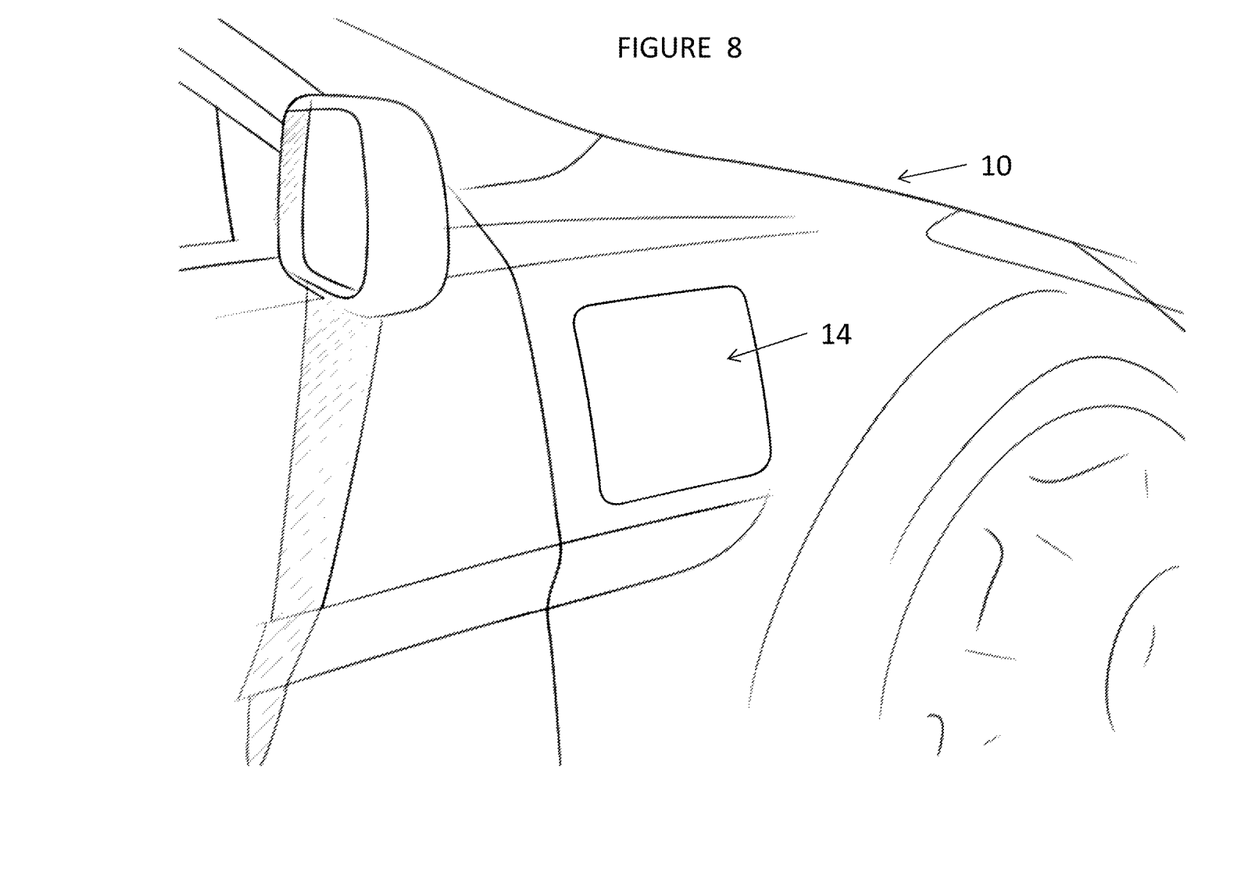
FIG. 8 is a perspective view of a chargeport on a vehicle with a cover in a closed configuration, according to a third embodiment.
Figure 9:
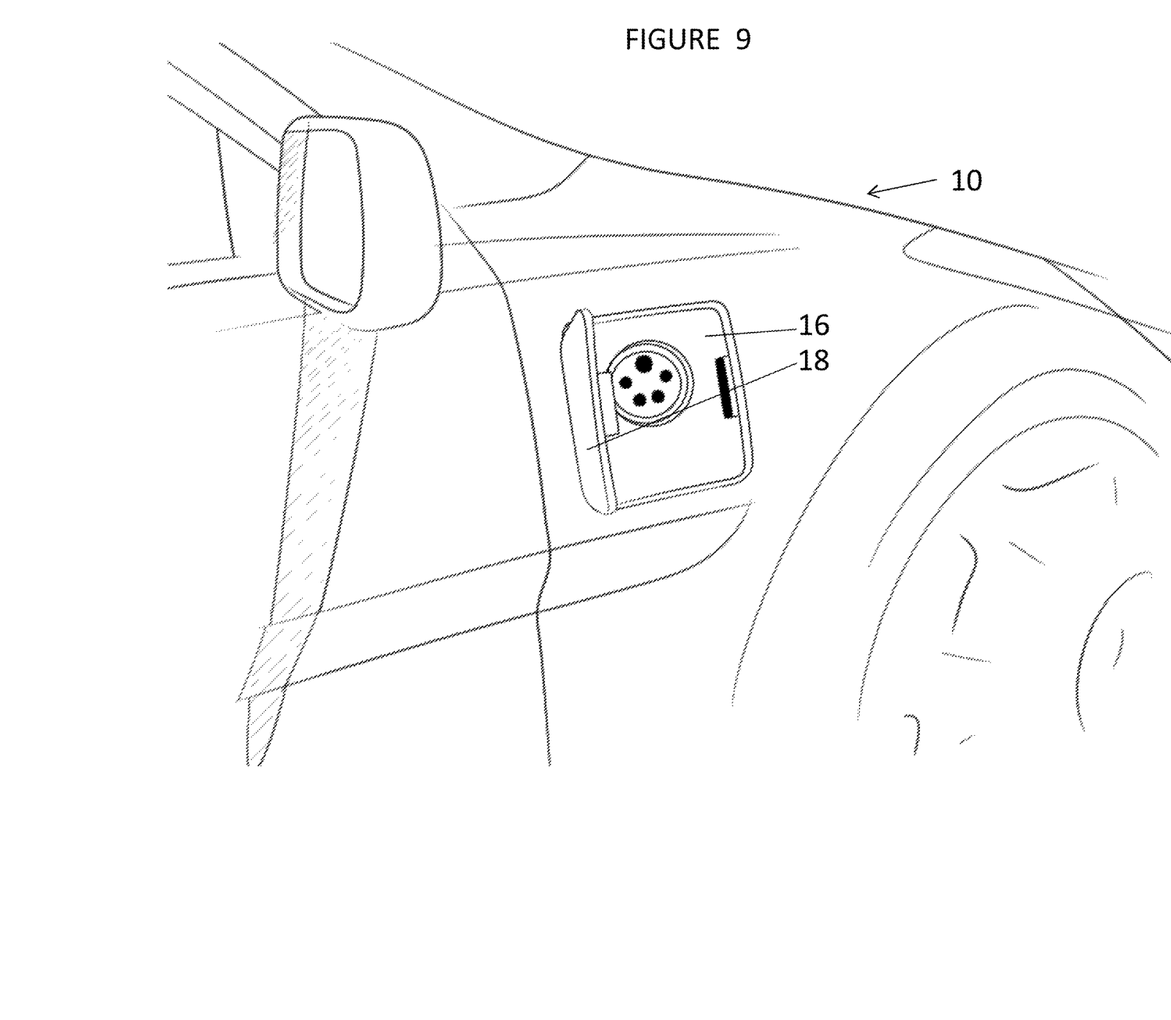
FIG. 9 is a perspective view of the chargeport shown in FIG. 8 with the cover configured for AC charging.
Figure 10:
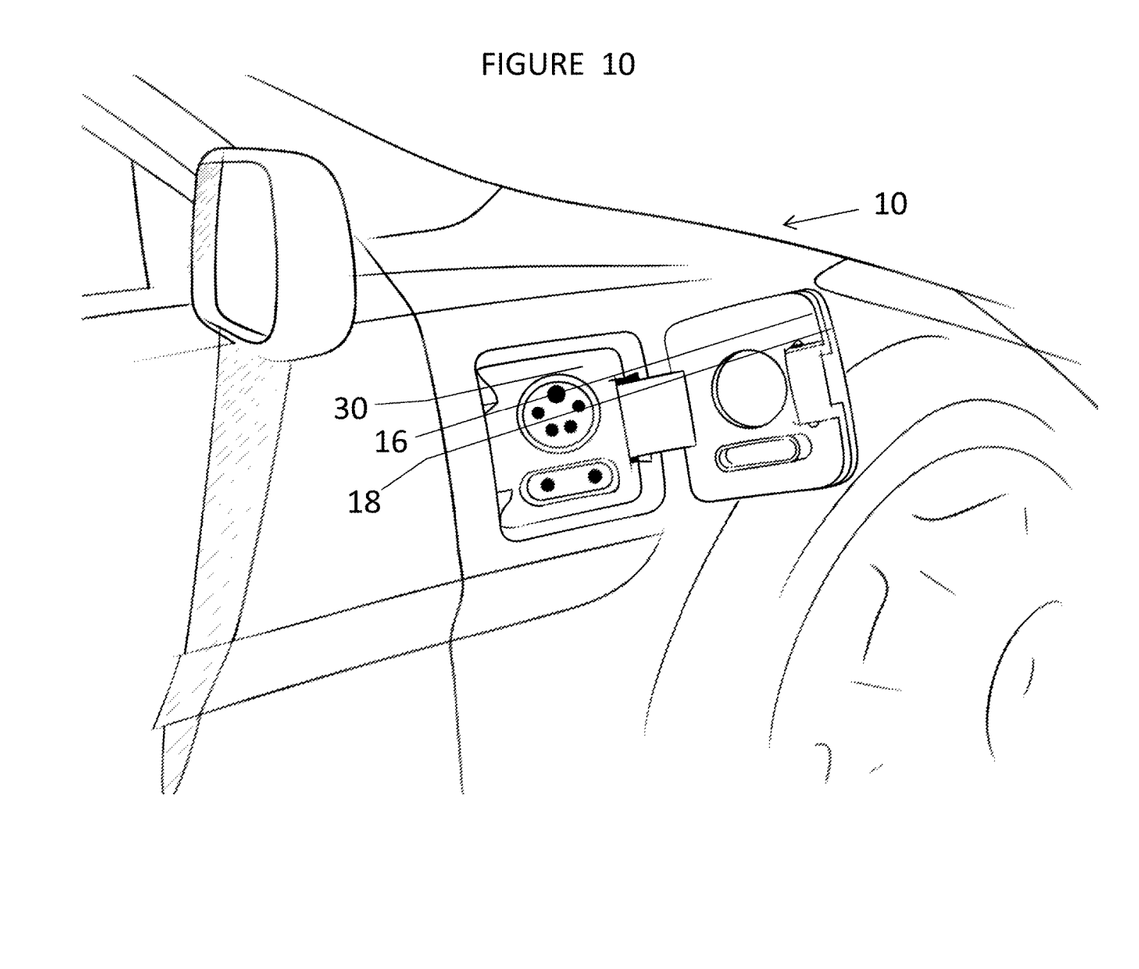
FIG. 10 is a perspective view of the chargeport shown in FIG. 8 with the cover configured for DC charging.

FIGS. 8-10 show a third embodiment of a two part closure 14 for a combo chargeport 12 for use in an electric vehicle 10. Where parts are common between the embodiments, the same reference numerals have been used to denote these parts as found above in the description of the first and/or second embodiments, shown in FIGS. 1-7.

In the embodiment shown in FIGS. 8-10, the inner 16 and outer 18 parts are configured to create a double hinged door which can effectively open in either direction, depending on whether AC or DC charging is required. FIG. 8 shows the closure 14 in the closed position. The provision of hinges on opposite sides obviates the need for a specific dimple or button for the user to operate the correct part of the closure 14, although it will be appreciated that some visual cue may still be provided to guide the user as to which side of the closure 14 enables access to each charging mode.

In FIG. 9, the closure 14 is shown open for AC charging, with the inner part 16 in place, providing an aperture that just allows access to the AC chargeport. The inner part 16 is configured as a substantially planar door having substantially the same foot print as the outer part 18. Access to the AC chargeport through the inner part 16 is facilitated by a substantially circular opening in the inner part 16. The outer part 18 is provided with a hinge at the left side and a latch at the right side thus enabling the closure to be opened for AC charging by unlatching the latch and rotating the outer part 18 to the left to reveal the AC chargeport.

FIG. 10 shows the closure 14 open for DC charging, with the inner 16 and outer 18 parts having moved together, hinging at the right.

In some embodiments, not shown in the accompanying drawings, the release mechanism may take the form of a detent into which the user places a digit in order to apply force directly against a spring-biased hinge to open the closure.

It will be appreciated that dust seals may be provided but which are not shown in the accompanying drawings for the sake of clarity.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A two-part closure for a combo chargeport for use on an electric vehicle and comprising:
   an inner part including a dust cover for the DC chargeport; and
   an outer part configured to cover the AC chargeport, wherein the inner and outer parts are hingeably attached to the vehicle such that the closure can be opened by a user with a single action.

2. The closure according to claim 1, wherein the inner and outer parts are hingeably attached to the vehicle such that the closure can be opened for AC charging in a single action.

3. The closure according to claim 1, wherein the inner and outer parts are hingeably attached to the vehicle such that the closure can be opened for DC charging in a single action.

4. The closure according to claim 1, wherein the inner part comprises an inner substantially planar door, and wherein the outer part comprises an outer substantially planar door.

5. The closure according to claim 4, wherein a primary surface of the inner and outer substantially planar doors is configured to match contours of a vehicle exterior when the inner and outer substantially planar doors are in a closed position.

6. The closure according to claim 5, wherein the primary surface of the inner substantially parallel planar door comprises an A-surface section and a B-surface section.

7. The closure according to claim 1, wherein the closure is provided on an exterior of the vehicle.

8. The closure according to claim 1, wherein the outer part is substantially planar and is configured to at least partly cover the inner part when the closure is closed.

9. The closure according to claim 1, wherein the dust cover is provided on a secondary surface of the inner part and wherein the dust cover comprises a plurality of protrusions that extend substantially orthogonally from the secondary surface of the inner part.

10. The closure according to claim 1, wherein the dust cover is provided on a secondary surface of the inner part and wherein the secondary surface is substantially parallel to a primary surface of the inner part.

11. The closure according to claim 1, wherein the inner part further comprises a first fastener configured to hold the inner part in a closed position, and wherein the outer part further comprises a second fastener configured to hold the outer part in a closed position.

12. The closure according to claim 11, wherein the first fastener is a push-push latch.

13. The closure according to claim 12, wherein the first fastener incorporates a captive button.

14. The closure according to claim 11, wherein the first and second fasteners are positioned one above the other.

15. The closure according to claim 11, wherein the first and second fasteners are positioned at opposite sides of the closure.

16. The closure according to claim 11, wherein the second fastener for the outer part comprises a dimple on a primary surface of the outer part, a protrusion on a secondary surface on the outer part and a recess on the primary surface of the inner part.

17. The closure according to claim 11, wherein the combo chargeport is provided in a mounting surface which is substantially parallel to a vehicle exterior, and wherein the first fastener for the inner part comprises a dimple on the primary surface of the inner part, a protrusion on a secondary surface of the inner part and a recess on the mounting surface of the port.

18. The closure according to claim 1, wherein the inner and outer parts are hingeably attached to the vehicle using a single hinge axis.

19. The closure according to claim 1, wherein the inner and outer parts are hingeably attached to the vehicle using two separate hinges applied to opposite sides of the closure.

20. A closure for a combo chargeport comprising first and second chargeports for use on an electric vehicle, comprising:
- an inner part including a dust cover for the first chargeport; and
- an outer part configured to cover the second chargeport, wherein the inner and outer parts are hingeably attached to the vehicle such that the closure can be opened by a user for charging with the first chargeport in a single action and closed by a user with a single action.

* * * * *